Nov. 14, 1944.                    H. L. PORCH                    2,362,926
                              COATING SPRAY CONTROL
                              Filed July 19, 1941                3 Sheets-Sheet 3
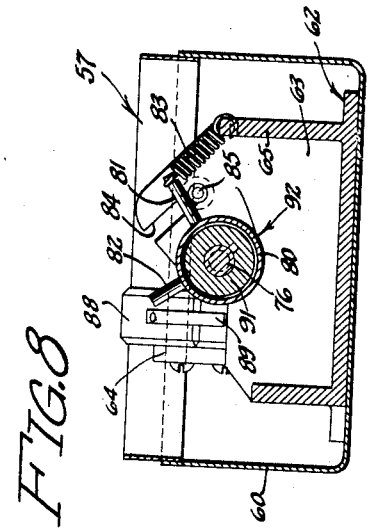
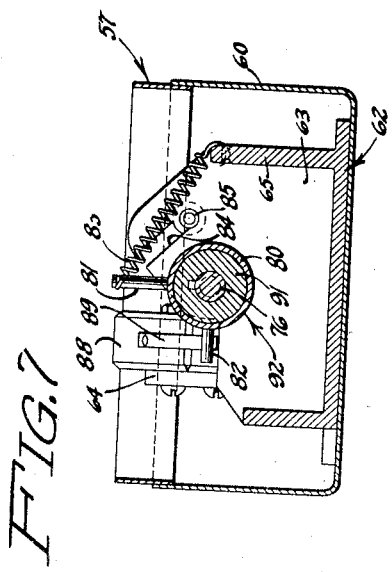
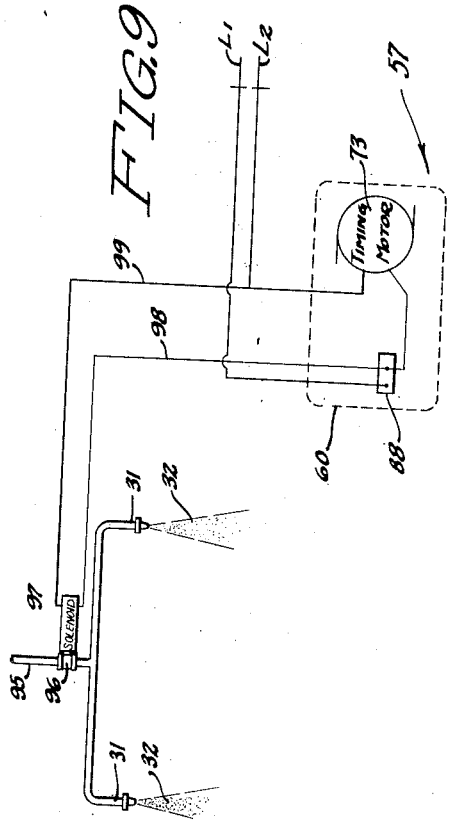
INVENTOR:
HOWARD L. PORCH
BY
ATTORNEY Patented Nov. 14, 1944

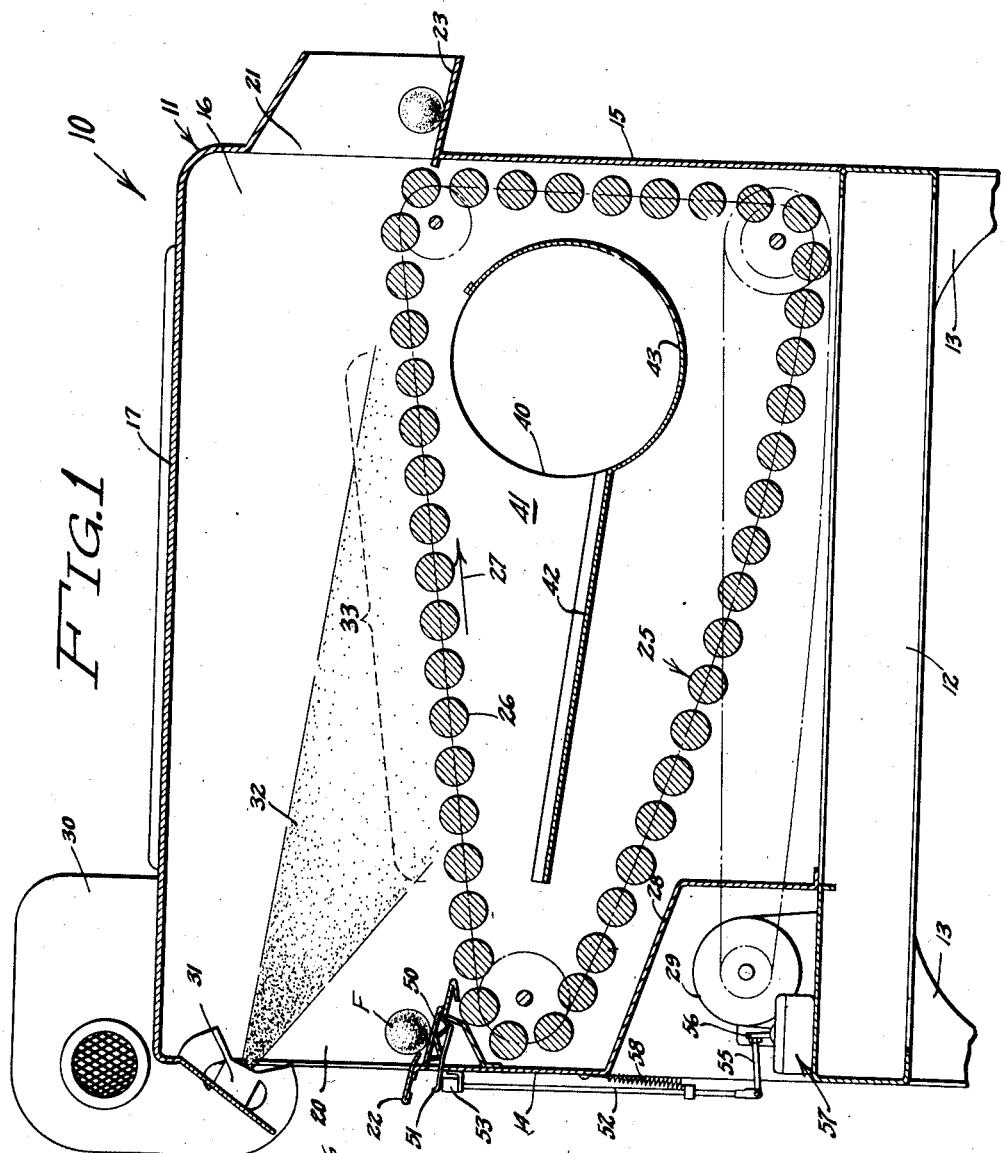
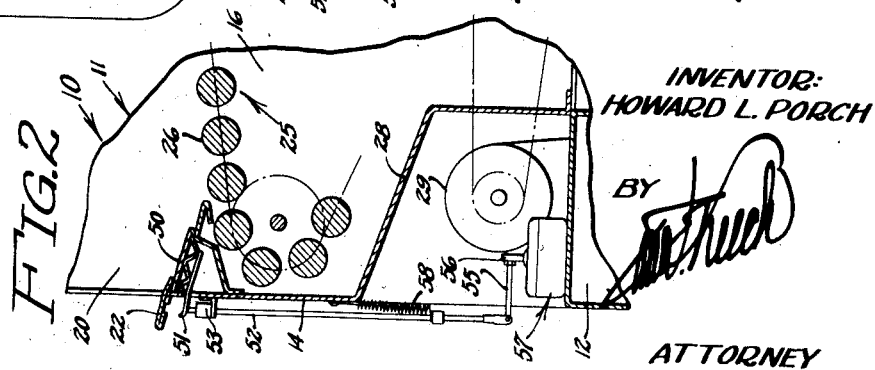

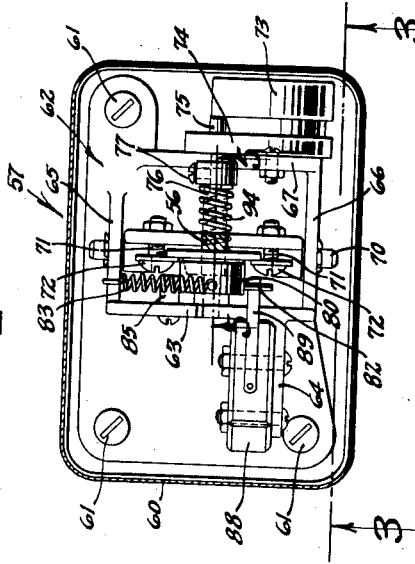

2,362,926

UNITED STATES PATENT OFFICE 2,362,926

COATING SPRAY CONTROL

Howard L. Porch, Riverside, Calif., assignor to Food Machinery Corporation, San Jose, Calif., a corporation of Delaware Application July 19, 1941, Serial No. 403,079

7 Claims. (Cl. 91—45)

My invention relates to the coating art and has special utility in the coating of fresh fruits and vegetables.

In the fresh fruit and vegetable packing industry it has been found advantageous to coat fruits and vegetables with a very thin coating of waxy material in order to preserve these fresh products from shrinkage during their travel to distant markets.

One of the most successful processes for coating fruit involves forming a solution of the coating material in a volatile solvent and then spraying this solution in highly atomized form onto the fruit. The solution thus applied is allowed to remain undisturbed on the skin of the fruit until the solvent evaporates, leaving a deposit of coating material on the fruit.

The practice of coating fresh fruit is generally carried on as one of a series of steps through which the fruit is passed preparatory to its being packed. These include the steps of washing, drying, sizing and sorting the fruit, the fruit traveling in a substantially continuous flow through this series of operations.

Occasionally this flow of fruit is interrupted temporarily from one cause or another and where the coating material is being sprayed onto the fruit, as above outlined, it is very desirable that the spray of coating material be likewise interrupted until the flow of fruit starts again. If this is not done too heavy a deposit of coating material is likely to be applied to the first fruit to be processed after the flow of fruit is resumed, which deposit will impede the respiration of this fruit to such an extent as to spoil the flavor of the fruit and in some cases produce decay.

Attempts have been made to prevent overcoating the fruit but this end has not been attained without permitting some of the fruit to go by uncoated.

It is an object of my invention to provide an apparatus for spraying coating material on fresh products such as fruit in which the spray will be controlled so as not to apply an excessive quantity of coating material to any of the fruit and yet which will avoid permitting some of the fruit to go by uncoated.

The manner of accomplishing the foregoing objects, as well as further objects and advantages, will be made manifest in the following description taken in connection with the accompanying drawings, in which:

Fig. 1 is a diagrammatic cross sectional view of a fruit coating machine at present in current commercial use with a prefered form of the device of my invention embodied therewith, this view showing an orange just leaving said machine and another orange just entering said machine, the entering orange being positioned to start a spray of coating material in the machine.

Fig. 2 is a fragmentary view illustrating a portion of Fig. 1 in which the device of my invention is embodied with the parts thereof disposed as when no fruit is entering said machine.

Fig. 3 is a longitudinal sectional view of the control mechanism of my invention showing it positioned as when stopping the spray of coating material in said machine.

Fig. 4 is a horizontal sectional view taken on the line 4—4 of Fig. 3.

Fig. 5 is an enlarged fragmentary longitudinal sectional view taken on the line 5—5 of Fig. 4, this view showing the clutch of said control mechanism engaged as when no fruit is entering the machine.

Fig. 6 is a view similar to Fig. 5 showing the clutch of said control mechanism disengaged as by fruit entering the machine.

Fig. 7 is a vertical cross sectional view taken on the line 7—7 of Fig. 5 and showing the switch opened and motor and spray shut off.

Fig. 8 is a similar vertical cross sectional view taken on the line 8—8 of Fig. 6, showing the switch allowed to close, motor and spray turned on.

Fig. 9 is a wiring diagram of the electric circuit of the invention.

Referring specifically to the drawings, I have shown therein a spray waxer 10 including a rectangular housing 11, having a floor 12, supporting legs 13, front and rear walls 14 and 15, side walls 16 and a top wall 17. Provided in the front and rear walls 14 and 15 are fruit inlet and discharge openings 20 and 21, there being a delivery board 22 mounted along the lower edge of the opening 20 and inclined inwardly for receiving fruit delivered to the machine 10, while a discharge board 23, inclined outwardly, is provided in the discharge opening 21 of the machine.

Mounted in a manner well known in the art, in the interior of the housing 11, is a roller conveyor 25, the upper flight 26 of which is disposed along an upwardly inclined path so that when this conveyor travels in the direction of the arrow 27 it receives fruit from the delivery board 22, conveys this along a path extending through the machine 10 and discharges this fruit onto the discharge drop board 23 over which the fruit gravitates from the machine. Provided in the end wall 14 is a motor housing 28 which contains a motor 29 for driving the conveyor 25.

Mounted on the top wall 17 is a power spray unit 30 having nozzles 31, this unit expelling from these nozzles streams 32 of fine atomized particles of a solution of coating material so that these particles travel directly from the nozzles 31 into contact with fruit traveling on the conveyor upper flight 26 within the zone 33 (see Fig. 1).

One of the walls 16 is provided with an air exhaust opening 40 which connects with a suction space 41 disposed just below the upper conveyor flight 26, the bottom of which is covered by a drip pan 42 in a semi-cylindrical wall 43 which connect together, as shown in Fig. 1, and extend entirely across the space between the side walls 16. A suitable air blower (not shown) is disposed outside the housing 11 and connected with the opening 40 to evacuate air from the chamber to the suction space 41, thus drawing air downwardly between the rollers of the upper conveyor flight 26 while the machine is operated so as to prevent an accumulation of vapors of the solvent used in connection with the coating material applied by the machine 10.

The delivery board 22 has a depressible middle plate 50 provided with a finger 51, the latter resting against the upper end of a rod 52 which slides in a collar 53 mounted on the wall 14. The lower end of rod 52 is pivotally connected to an arm 55 of a clutch lever 56 of a control mechanism 57 which is mounted on the floor 12 in the motor housing 28. Attached to the rod 52 and the wall 14 is a spring 58 which holds this rod and the depressible plate 50 in upward position, as shown in Fig. 2, excepting when one or more pieces of fruit F may be rolling across this plate. When the latter occurs, as shown in Fig. 1, the weight of this fruit causes the plate 50 and rod 52 to be depressed with results to be described hereinafter.

The control mechanism 57 includes a rectangular shell 60 to the bottom of which is secured by bolts 61 a frame casting 62 having walls 63, 64, 65, 66 and 67 extending upwardly therefrom. Extending through suitable holes in the walls 65 and 66 and pinned in place is a clutch yoke shaft 70 on which the bifurcated lower end of the clutch yoke 56 is pivotally mounted. As shown in Figs. 3 and 4, this clutch yoke has screws with heads 72 which are located in closely spaced relation with the body of the yoke 56.

Mounted on the wall 67 is a small motor 73 with a gear box 74, the latter gearing the motor 73 to a shaft 75, this latter being received axially in an opening in one end of a clutch shaft 76 and rigidly secured thereto by a set screw 77, said shaft having at its other end a portion 78 of reduced diameter which extends into and journals in a hole 79 in the wall 63. Freely rotatable on the shaft portion 78 is a cone clutch bell 80, this bell having pins 81 and 82 extending radially therefrom. Connected at its opposite end to the pin 81 and to the wall 65 is a contractile spring 83. Adjustably mounted in a slot 84 formed in the wall 63 is a stop pin 85, the purpose of this pin being to limit the angular position of rest of the clutch bell 80 when the spring 83 rotates this bell so as to bring the pin 81 into contact with the pin 85.

Secured on the wall 64 is a micro-switch 88 having a yieldable arm 89, the depression of which brings this into engagement with a switch pin 90 which opens switch 88.

As shown in Figs. 3, 4 and 7, the inner end of the switch arm 89 extends into the rotational path of the clutch pin 82.

Splined on the shaft 76 is a clutch cone 91 which unites with clutch bell 80 to form a clutch 92. The clutch cone 91 has an annular flange 93 which extends between the clutch yoke 56 and the bolt heads 72.

The electric circuit of the machine 10 is shown in Fig. 9 where it is seen that coating material solution is fed to the nozzles 31 through a pipe 95, this pipe having a valve 96 controlled by a solenoid 97. Electricity is supplied from power lines L—1 and L—2 through conductors 98 and 99 to the timing motor 73 and the solenoid 97. The micro-switch 88 is located between the main line L—1 and the conductor 98 so that when this switch is closed by the arm 89 being released from pressure from the pin 82, current is supplied to the timing motor 73 causing this to run, and to the solenoid 97 causing this to open the valve 96 and permit coating material solution to be supplied through the pipe 95 to the nozzles 31, thus causing sprays of atomized particles of coating material solution 32 to be produced and directed against pieces of fruit F traveling on the upper conveyor flight 26 through the zone 33. Likewise, when the switch arm 89 is depressed, as when this is engaged by the clutch pin 82 so as to open the switch 88, this immediately shuts off the valve 96 and the timing motor 73.

*Operation*

The particular process with which this invention is concerned is that covered by U. S. Letters Patent to Sharma No. 2,212,621.

The problem involved is to so control the production of atomized particles of coating material solution 32 that all of the fruit F passing through the machine 10 will be properly covered with coating material, yet not permit an accumulation of this coating material on the rolls of the conveyor 25 during a break in the supply of fruit to the conveyor, so that when fruit is again supplied to this conveyor excess quantities of coating material are picked up by the fruit from the conveyor rolls, thus doing a bad job of coating the fruit and probably damage the fruit.

In the normal operation of the machine 10 the fruit F is fed in a more or less continuous supply across the drop board 22 and is carried in a continuous flow along the pathway lying just above the upper conveyor flight 26 and thence out of the machine over the drop board 23. Flowing along this path the fruit F passes through the coating zone 33 in which the fruit is subjected to the cones of atomized particles of coating solution 32 produced by the nozzles 31.

When changing from one lot of fruit to another and in certain minor emergencies in the packing of the fruit, which are not of infrequent occurrence, there is a cessation of the supplying of fruit F over the delivery board 22 to the conveyor 25. As soon as the fruit is being delivered in a relatively constant flow over the delivery board 22 pieces of fruit F are rolling over and depressing the plate 50, as shown in Fig. 1. This movement is transmitted to the arm 55 and swings the clutch yoke 56, as shown in Fig. 6, thereby compressing the spring 94 and withdrawing the clutch cone 91 from the clutch bell 80. The clutch bell is thereby freed to be rotated by the spring 83 about its shaft 78 into the position in which it is shown in Fig. 8 where the pin 81 has been brought to rest against the stop pin 85.

When the clutch bell 80 is so positioned, the pin 82 is out of contact with the spring switch arm 89 which causes the switch 88 to remain closed. As already pointed out, while this condition exists the motor 73 continues to rotate the shaft 75 and the clutch shaft 76 and the clutch cone 91 splined thereon, and the valve 96 continues to remain open causing the nozzles 31 to spray coating material onto the fruit.

Whenever there is any cessation of the supply of fruit F to the conveyor 25, so that the depressible plate 50 is allowed to rise under the influence of the spring 58, as shown in Fig. 2, the clutch yoke 56 is brought into vertical position under the influence of springs 58 and 94, thus frictionally inserting the clutch cone 91 into the clutch bell 80. As the shaft 76 is being continuously rotated by the motor 73 (although this rotation is at a very slow rate of speed owing to the low gear ratio in the gear box 74) the clutch cone 91 is also being rotated and this rotation is transmitted to the clutch bell 80 which if the plate 50 remains in upper position, as shown in Fig. 2, for a predetermined interval, results in the pin 82 being shifted from the position in which it is shown in Fig. 8 to the position in which it is shown in Fig. 7 where it depresses the switch arm 89 and opens the switch 88.

As previously pointed out, opening this switch deenergizes the motor 73 and the solenoid 97 and shuts off the valve 96 thereby causing the delivery of atomized coating material to the zone 33 to cease immediately.

The rest position of the pin 81 is so determined by the location of the adjustable stop pin 85 in the slot 84 that the predetermined interval of time intervening between the cessation of the supply of fruit to the conveyor 25 and the deenergizing of the timing motor 73 and the solenoid 97 is such that the last of the fruit supplied over the delivery board 22 to the conveyor 25 is carried by the upper flight of this conveyor a sufficient distance into the zone 33 during this interval so that this fruit has received an adequate deposit of coating material from the nozzles 31 before the latter are shut off by the deenergizing of the solenoid 97.

When the supply of fruit F to the upper flight of the conveyor 25 is resumed, the first piece of fruit to cross the delivery board 22 depresses the plate 50 of this delivery board thereby immediately turning on the supply of coating material solution to the nozzles 31 and causing a resumption of the application through these nozzles of atomized particles of coating material to any fruit traveling in the zone 33 on the upper conveyor flight 26. Thus the initial fruit supplied to the machine 10 on the resumption of operations, after a cessation of said supply, is assured of receiving an adequate deposit of coating material directly from the nozzles 31.

While I have shown and described a single embodiment of my invention, it is to be understood that various changes and modifications might be made in this without departing from the spirit of the invention and the scope of the appended claims.

What I claim is:

1. In a machine for spraying coating material on fruit, the combination of: conveyor means for producing a flow of fruit along a given path; spray means for directing a spray of coating material onto said fruit in a given zone of said path; control means normally actuated by fruit approaching said zone and responsive to a cessation in the supply of fruit to said conveyor means to shut off said spray means; and delayed action means delaying said shutting off for a predetermined interval of time following said cessation, said interval being sufficient to permit the last of the fruit supplied to said conveyor means prior to said cessation to travel into said zone and receive an adequate coating of coating material directly from said spray means before said spray means is shut off, said control means also being responsive to the recommencing of said supply of fruit to said conveyor means to turn on said spray means.

2. In a machine for spraying coating material on fruit, the combination of: conveyor means for producing a flow of fruit along a given path; spray means for directing a spray of coating material onto said fruit in a given zone of said path; means for supplying fruit to said conveyor means at a point just in advance of said zone; control means normally actuated by fruit supplied to said point as aforesaid and responsive to a cessation of the supply of fruit at said point to turn off said spray means; and delayed action means allowing said spray means to continue operation a predetermined interval of time following said cessation, said interval being sufficient for the last of the fruit supplied to said conveyor means prior to said cessation to travel into said zone and receive an adequate deposit of coating material directly from said spray means, said control means being responsive to a recommencing of said supply of fruit to said conveyor means to turn on said spray means.

3. In a machine for spray coating articles, the combination of: conveyor means for producing a flow of articles along a given path; spray means for directing a spray of coating material onto said articles in a given zone of said path; means for controlling said spray means, said control means being normally actuated by articles supplied to said conveyor means to prevent said control means turning off said spray means and responsive to a cessation of the supply of said articles to said conveyor means to shut off said spray means; and delayed action means for delaying the shutting off of said spray means following the cessation of said supply of articles until the last articles supplied to said conveyor means before said cessation occurred travel into said zone a sufficient distance to receive an adequate coating of said coating material directly from said spray means.

4. In a machine for spray coating articles, the combination of: conveyor means for producing a flow of articles along a given path; means for directing a spray of coating material onto said articles in a given zone of said path; means for delivering articles to said conveyor means at a point in advance of said zone; control means for turning on and shutting off said spray means, said control means automatically turning said spray means on when said control means is placed under restraint and automatically operating to shut off said spray means after the lapse of a pre-determined interval of time following the release of said control means; and means disposed adjacent to said point at which said articles are delivered to said conveyor for actuation by said articles to place said control means under restraint as aforesaid whereby said spray means, if turned off, is turned on by the delivery of articles to said conveyor and whereby, if no articles be so delivered during the lapse of an interval of time as aforesaid, said control means automatically operates through being unrestrained during said interval to shut off said spray means at the end of said interval.

5. In a machine for spray coating articles, the combination of: conveyor means for producing a flow of articles along a given path; spray means for directing a spray of coating material onto said articles in a given zone of said path; power operated means adapted after operating through a given cycle of movement to shut off said spray means; means automatically operating when unrestrained to initiate such a cycle of operation and adapted when placed under restraint to automatically restore said power means to its position at the beginning of a cycle of operation and to start said spray means if the latter had theretofore been stopped by said power means; means for delivering articles to said conveyor at a point in advance of said zone; and means adjacent the path of articles so delivered so as to be temporarily engaged by said articles in passing, and responsive to such engagement to temporarily restrain said cycle initiating means as aforesaid.

6. In a machine for spray coating articles, the combination of: conveyor means for producing a flow of articles along a given path; spray means for directing a spray of coating material onto said articles in a given zone of said path; electrically operated valve means for turning on and shutting off said spray means; a switch for controlling said valve means; means adapted to be power operated to actuate said switch to shut off said spray means after said power operated means has been operated through a cycle covering a predetermined interval of time; a prime mover continually operating while said spray means is turned on; a clutch for connecting said prime mover to said power operated means, said clutch automatically closing to initiate a cycle of operation of said power means as aforesaid whenever released from restraint; means for supplying articles to said conveyor means at a point in advance of said zone; means disposed adjacent to said articles as the latter travel toward said zone and responsive to engagement therewith by said articles to place said clutch means under restrain to disconnect said prime mover from said power operated means; and means for automatically returning said power operated means to its position at the beginning of a cycle of movement as aforesaid when said clutch is thus thrown out, said switch means starting said spray means, in case the latter had been turned off, when said power operated means is thus returned to intial position.

7. A combination as in claim 6, in which said prime mover is an electric motor; and in which said switch means de-energizes said electric motor when said spray means is shut off and energizes said motor when said spray means is turned on.

HOWARD L. PORCH.